United States Patent
Chen et al.

(10) Patent No.: US 8,705,706 B2
(45) Date of Patent: Apr. 22, 2014

(54) INTERACTIVE FLOWGRAPH FOR ANALYZING CALLER UTTERANCES

(75) Inventors: Fei Chen, Green Brook, NJ (US); Lorraine Denby, Berkeley Heights, NJ (US); Wen-Hua Ju, Monmouth Junction, NJ (US); James M. Landwehr, Summit, NJ (US); Patrick Tendick, Basking Ridge, NJ (US)

(73) Assignee: Avaya Inc., Basking Ridge, NJ (US)

( * ) Notice: Subject to any disclaimer, the term of this patent is extended or adjusted under 35 U.S.C. 154(b) by 621 days.

(21) Appl. No.: 12/728,650

(22) Filed: Mar. 22, 2010

(65) Prior Publication Data
US 2011/0228915 A1 Sep. 22, 2011

(51) Int. Cl.
*H04M 1/64* (2006.01)

(52) U.S. Cl.
USPC ............... 379/88.08; 379/88.04; 379/88.12; 379/88.18

(58) Field of Classification Search
USPC .......... 379/88.01–88.04, 93.21, 202.01, 379/221.04, 88.11, 88.08, 88.09, 88.12, 379/88.18, 265.01–266.1; 370/260–263, 370/356
See application file for complete search history.

(56) References Cited

U.S. PATENT DOCUMENTS

| | | | |
|---|---|---|---|
| 7,103,158 B2 | 9/2006 | Plan | |
| 7,916,855 B2 * | 3/2011 | Caballero-McCann et al. | 379/221.04 |
| 8,102,973 B2 * | 1/2012 | Peterson | 379/88.11 |
| 2007/0133777 A1 | 6/2007 | Agapi et al. | |
| 2007/0263603 A1 * | 11/2007 | Schmitt | 370/356 |
| 2009/0245493 A1 | 10/2009 | Chen et al. | |
| 2011/0066694 A1 | 3/2011 | Barrett | |

OTHER PUBLICATIONS

J. Rosenberg et al., "SIP: Session Initiation Protocol," Standards Track, Jun. 2002, 270 pages.

* cited by examiner

*Primary Examiner* — M D S Elahee
(74) *Attorney, Agent, or Firm* — John Maldjian, Esq.; Alexander D. Walter, Esq.; Kacvinsky Daisak Bluni PLLC

(57) ABSTRACT

A method is disclosed for associating a caller utterance with corresponding elements of a flowgraph that depicts a voice-response system. Thus, an analyst who selects an element in a flowgraph receives immediate access to those utterances—and only those utterances—that are associated with the selected element. The analyst can easily listen to the utterances and review statistics associated with them. The utterances are stored, retrieved, and presented in a systematic and organized way. In some embodiments in accordance with the present invention, an utterance is associated with the link between two events in the voice-response system. In some alternative embodiments, an utterance is associated with other data, including, but not limited to: the event that precedes it; the event that follows it; the telephone number of the caller.

25 Claims, 7 Drawing Sheets

INTERACTIVE FLOWGRAPH FOR ANALYZING CALLER UTTERANCES

FIELD OF THE INVENTION

The present invention relates to telecommunications in general, and, more particularly, to interactive voice response systems.

BACKGROUND OF THE INVENTION

Call centers are generally complex and challenging—for both callers and management. Long before reaching a human operator, a caller frequently interacts with a voice-response system that collects information from the caller to facilitate the call with the operator. Some callers are able to complete a transaction by interacting with the voice-response system without need of an operator. For example, a caller might obtain a bank account balance simply by asking the voice-response system for "current balance" and speaking the caller's account number.

On the other hand, many voice-response interactions are unsuccessful. Often, callers are asked to repeat themselves many times before finally being routed to an operator. When the caller is misunderstood, the call is misrouted or delayed. In such circumstances, callers can become frustrated and hang up.

Call center managers are perennially concerned with lost, delayed, and misrouted calls. Numerous reporting and analysis tools are available in the prior art that are directed at gathering and presentation of statistics for call center performance.

One innovation in call center reporting tools is the "flowgraph." A flowgraph is a pictorial representation of the salient operational aspects of a call as it flows through a call center. See, e.g., U.S. Pat. No. 7,103,158; U.S. Patent Application Publication No. 20070133777 A1; U.S. Patent Application Publication No. 20090245493 A1. A flowgraph displays a number of useful elements that pertain to the call's flow, such as a prompt event, a response event, a path taken by a call from a prompt event to a response event, a disconnect event, relevant statistics, etc. For example, a flowgraph can show how many calls were hung up before the caller received service or how many calls flowed from a first prompt to a second prompt.

Generally, the voice-response system in a call center asks the caller to speak a request. Sometimes the caller is asked to input digits from a telephone keypad. The caller's speech and telephone digits are referred to as the "utterance." The voice-response system's technology recognizes the caller's utterance and responds accordingly.

Based on its interpretation of what it heard, the voice-response system routes the call within the call center. For example, a caller who said "current balance" is routed to entering an account number or a password. When the voice-response system does not understand the caller's utterance, it usually asks for repetition. It may ask the caller to repeat three, four, or maybe a dozen times before routing the call to an operator. Or it may misroute the call.

One reason for improperly understanding a caller's utterance may be the mis-calibration of the voice recognition parameters. Another reason may be that the caller asks for an option that the system does not offer, such as asking for "service" when the only options are "current balance" and "teller." Another reason may be that the caller is asking for a proper option but with an accent or in a language that the system does not understand.

Frequently, the only way to address these issues is to listen to the utterance. Call centers can record caller utterances for subsequent analysis. Some call centers record each call from beginning to end, including the caller's utterances, the prompts, and the system responses that occurred through the duration of the call. These recordings of a call from end to end are useful, but can be difficult to analyze in large numbers. Considering the large volume of calls experienced by a call center, and the fact that a single call may result in numerous utterances as it flows through the voice-response system, a call center can quickly accumulate a huge number of recorded utterances or end-to-end recordings.

Listening to utterances is time-consuming for the analyst tasked with finding possible deficiencies in a voice-response system. For example, an analyst's flowgraph shows that ten percent of incoming calls are hung up by callers after the first prompt. This is useful information, but is insufficient to diagnose the reasons. Delving more deeply into the problem is daunting. First, the analyst must identify each call that hung up after the first prompt. Next, the analyst must determine how many utterances were recorded for each relevant call. Then, the analyst must search through the mass of recorded utterances in the call center to find every utterance of interest. Finally, the analyst is ready to listen to the selected utterances and complete the analysis. This process is lengthy and prone to error. Therefore, a need exists for a more streamlined approach for analyzing utterances.

SUMMARY OF THE INVENTION

The inventors of the present invention recognized that flowgraph analysis in the prior art was primarily directed at operational performance statistics, but not at correlating utterances with key elements of the voice-response system. The inventors devised an innovative way to streamline access to utterances of interest by improving flowgraph tools. Thus, an analyst who selects an element in a flowgraph receives immediate access to those utterances—and only those utterances—that are associated with the selected element. The analyst can easily listen to the utterances and review statistics pertaining to them. The utterances are stored, retrieved, and presented in a systematic and organized way.

By contrast, the prior art offers no associations between individual utterances and the flowgraph elements where they occurred. As noted, prior art flowgraphs are directed at statistics pertaining to call flows, but not at the utterances that occur within a call flow. And, as noted, end-to-end recordings of a call in the prior art do not offer access to particular elements of interest within a given call.

In some embodiments of the present invention, an utterance is associated with the link between the event that preceded the utterance and the event that followed it. A "link" is an association between two events in a flowgraph. In some alternative embodiments, an utterance is associated with the event that precedes it, i.e., the event in the voice-response system that elicited the utterance, such as a prompt to the caller. In some alternative embodiments, an utterance is associated with the event that follows it, such as another prompt or a caller's hanging up. In some alternative embodiments, an utterance is associated with the telephone number of the caller. Other methods of association, storage, and retrieval of caller utterances are disclosed in more detail below and in the accompanying figures.

The illustrative embodiment comprises:
  receiving, at a data-processing system, a first signal that
    indicates a link in a flowgraph, wherein the link comprises an association between a first event and a second event in a voice-response system; and retrieving, by the data-processing system, a file that is associated with the link, wherein the file comprises a recording of an utterance that was made by a caller in response to the first event in the voice-response system.

DETAILED DESCRIPTION

Figure 1:
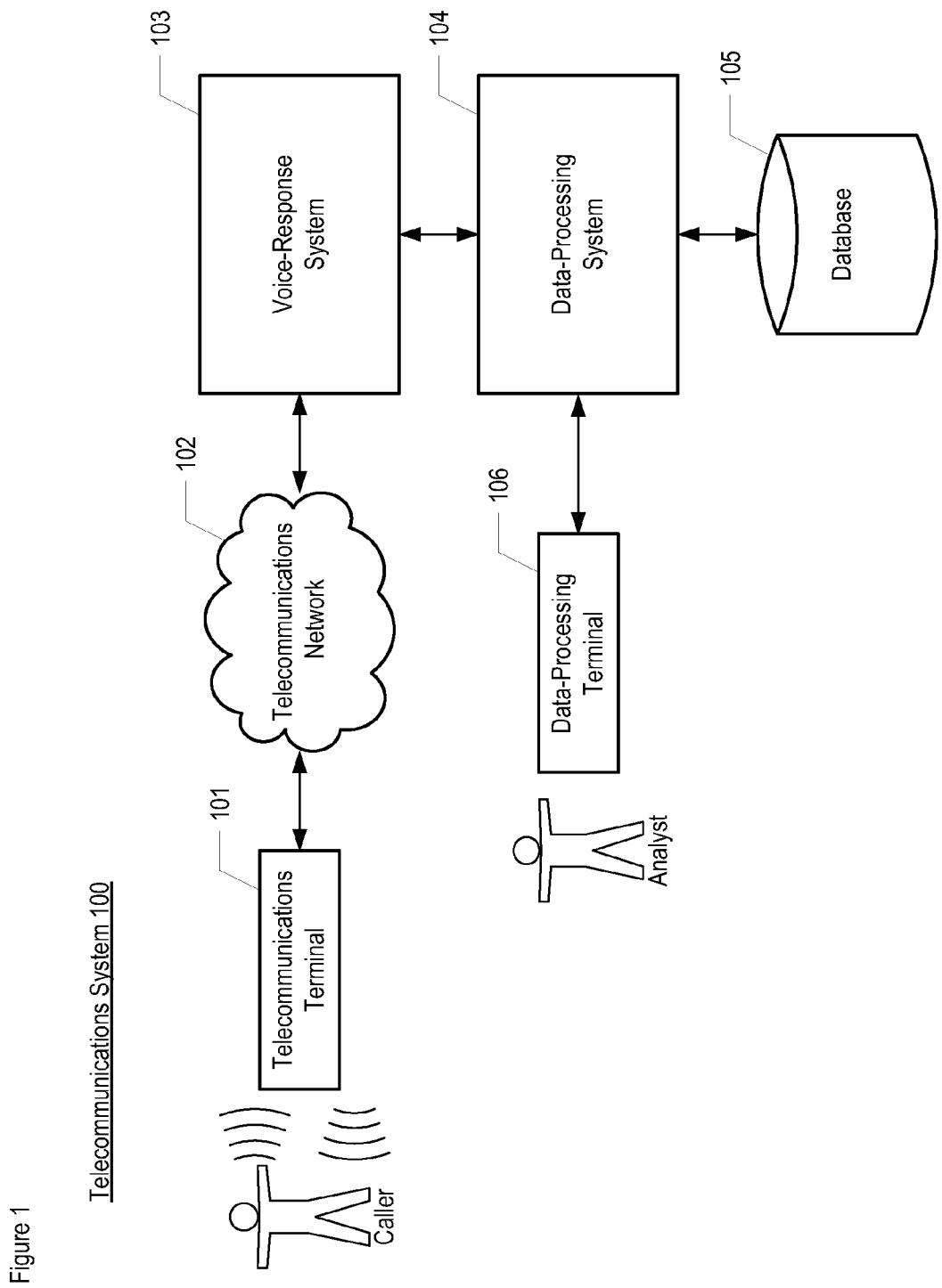
FIG. 1 depicts a schematic diagram of the salient portions of telecommunications system 100 according to the illustrative embodiment of the present invention.

FIG. 1 depicts a schematic diagram of the salient portions of telecommunications system 100 according to the illustrative embodiment of the present invention. Telecommunications system 100 is an apparatus that comprises: telecommunications terminal 101, telecommunications network 102, voice-response system 103, data-processing system 104, database 105, and data-processing terminal 106. FIG. 1 also depicts a caller positioned at telecommunications terminal 101. FIG. 1 additionally depicts an analyst positioned at data-processing terminal 106.

Although the illustrative embodiment comprises one telecommunications terminal 101, it will be clear to those having ordinary skill in the art, after reading this disclosure, how to make and use alternative embodiments of the present invention that comprise any number of telecommunications terminals, e.g., two telecommunications terminals, three telecommunications terminals, etc.

Although the illustrative embodiment comprises one telecommunications network 102, it will be clear to those having ordinary skill in the art, after reading this disclosure, how to make and use alternative embodiments of the present invention that comprise any number of telecommunications networks, e.g., two telecommunications networks, three telecommunications networks, etc.

Although the illustrative embodiment comprises one voice-response system 103, it will be clear to those having ordinary skill in the art, after reading this disclosure, how to make and use alternative embodiments of the present invention that comprise any number of voice-response systems, e.g., two voice-response systems, three voice-response systems, etc.

Although the illustrative embodiment comprises one data-processing system 104, it will be clear to those having ordinary skill in the art, after reading this disclosure, how to make and use alternative embodiments of the present invention that comprise any number of data-processing systems, e.g., two data-processing systems, three data-processing systems, etc.

Although the illustrative embodiment comprises one database 105, it will be clear to those having ordinary skill in the art, after reading this disclosure, how to make and use alternative embodiments of the present invention that comprise any number of databases, e.g., two databases, three databases, etc.

Although the illustrative embodiment comprises one data-processing terminal 106, it will be clear to those having ordinary skill in the art, after reading this disclosure, how to make and use alternative embodiments of the present invention that comprise any number of data-processing terminals, e.g., two data-processing terminals, three data-processing terminals, etc.

Although the illustrative embodiment depicts the salient components of telecommunications system 100 connected as shown in FIG. 1, it will be clear to those having ordinary skill in the art, after reading this disclosure, that one or more of these components can be directly connected to one or more of the other components. Thus, for example, voice-response system 103 can be directly connected to database 105.

Although the illustrative embodiment depicts the salient components of telecommunications system 100 connected as shown in FIG. 1, it will be clear to those having ordinary skill in the art, after reading this disclosure, that one or more of these components can be connected to one or more of the other components via one or more telecommunications networks. Thus, for example, voice-response system 103 can be connected to data-processing system 104 via telecommunications network 102 or via another telecommunications network. Likewise, data-processing terminal 106 can be connected to data-processing system 104 via telecommunications network 102 or via another telecommunications network.

Although the illustrative embodiment depicts the salient components of telecommunications system 100 as being separate from one another, it will be clear to those having ordinary skill in the art, after reading the present disclosure, that a single physical device can comprise one or more of the depicted components. Thus, for example, a single physical device can comprise voice-response system 103, data-processing system 104, and database 105.

Telecommunications terminal 101 is well-known prior art hardware that is a wireline telephone. It will be clear to those having ordinary skill in the art, after reading the present disclosure, how to make and use alternative embodiments of the present invention telecommunications terminal 101 can be any personal computer platform, a computer terminal, a personal digital assistant, a Blackberry, an IPhone, a wireless telephone, or any device capable of transmitting caller utterances in the form of speech and receiving information in response.

As noted, the term "utterance" refers to speech that a caller speaks or digits that a caller enters at a telephone when connected to voice-response system 103. It will be clear to those having ordinary skill in the art that in this context an utterance is also known as voice answer, voice input, voice response, speech answer, speech input, speech response, audio, audio answer, audio response, audio input.

Telecommunications network 102 is an apparatus well-known in the art that is capable of carrying speech between telecommunications terminal 101 and voice-response system 103.

Voice-response system 103 is an apparatus that is capable, at least in part, of receiving spoken instructions in the form of utterances from callers and is further capable of responding to callers' respective instructions. Other capabilities of voice-response system 103 are described below and in the accompanying figures. It will be clear to those having ordinary skill in the art that in this context a voice-response system is also known as an interactive voice response system or IVR.

Data-processing system 104 is a computer that receives, transmits, and processes information. Other capabilities of data-processing system 104 are described below and in the accompanying figures. It will be clear to those having ordinary skill in the art, after reading the present disclosure, how to make and use alternative embodiments of the present invention in which data-processing system 104 is any device capable of processing data and receiving and transmitting data from one or more other devices.

Database 105 is hardware that stores information that can be retrieved. It will be clear to those having ordinary skill in the art, after reading the present disclosure, how to make and use alternative embodiments of the present invention in which database 105 is a computer, an online file system, or any other electronic data depository that is capable of receiving, storing, retrieving, and transmitting data to and from one or more other devices. It will be clear to those having ordinary skill in the art, after reading the present disclosure, how the salient information of telecommunications system 100 is stored, organized, and retrieved from database 105.

Data-processing terminal 106 is an apparatus that is well known in the art that is capable of accepting input from a user, displaying information to the user, and transmitting and receiving information from data-processing system 104.

The caller depicted in FIG. 1 is a person who interacts with voice-response system 103 by voice, via telecommunications terminal 101. The caller speaks to voice-response system 103 and listens to the responses issued by voice-response system 103. It will be clear to those having ordinary skill in the art, after reading the present disclosure, how to make and use alternative embodiments of the present invention in which the caller interacts with voice-response system 103 in other ways, such as by dual-tone multi-frequency ("DTMF") digits from the caller's telephone.

The analyst depicted in FIG. 1 is a person who interacts with telecommunications system 100 via data-processing terminal 106. The illustrative embodiment enables the analyst in FIG. 1 to view information about voice-response system 103, indicate items of interest, and view or listen to the results.

The details of telecommunications system 100 are further described below. It will be clear to those having ordinary skill in the art, after reading the present disclosure, how to make and use telecommunications system 100.

Figure 2:
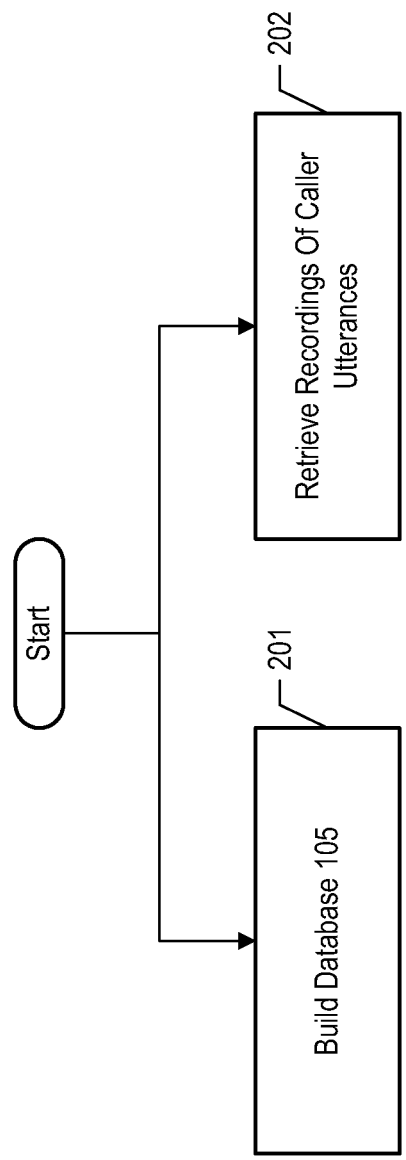
FIG. 2 depicts a flowchart of the salient tasks of telecommunications system 100 according to the illustrative embodiment.

FIG. 2 depicts a flowchart of the salient tasks of telecommunications system 100 according to the illustrative embodiment.

Telecommunications system 100 comprises task 201 and task 202. As shown in FIG. 2, these tasks operate independently.

Although the illustrative embodiment of telecommunications system 100 comprises only two tasks, it will be clear to those having ordinary skill in the art, after reading the present disclosure, how to make and use alternative embodiments of the present invention that has any number of tasks or subdivisions of tasks, e.g., one task comprising task 201 and task 202, two tasks that are differently sub-divided, three tasks, four tasks, etc. Furthermore, it will be clear to those having ordinary skill in the art, after reading the present disclosure, how to make and use alternative embodiments of the present invention in which tasks 201 and task 202 operate in parallel, or alternatively, operate interdependently. Furthermore, it will be clear to those having ordinary skill in the art, after reading the present disclosure, how to make and use alternative embodiments of the present invention with multiple instances of either task 201 or task 202, or both.

At task 201, the contents of database 105 are built. Task 201 is described in further detail below and in the accompanying figures.

At task 202, recordings of caller utterances are retrieved. Task 202 is described in more detail below and in the accompanying figures.

Figure 3:
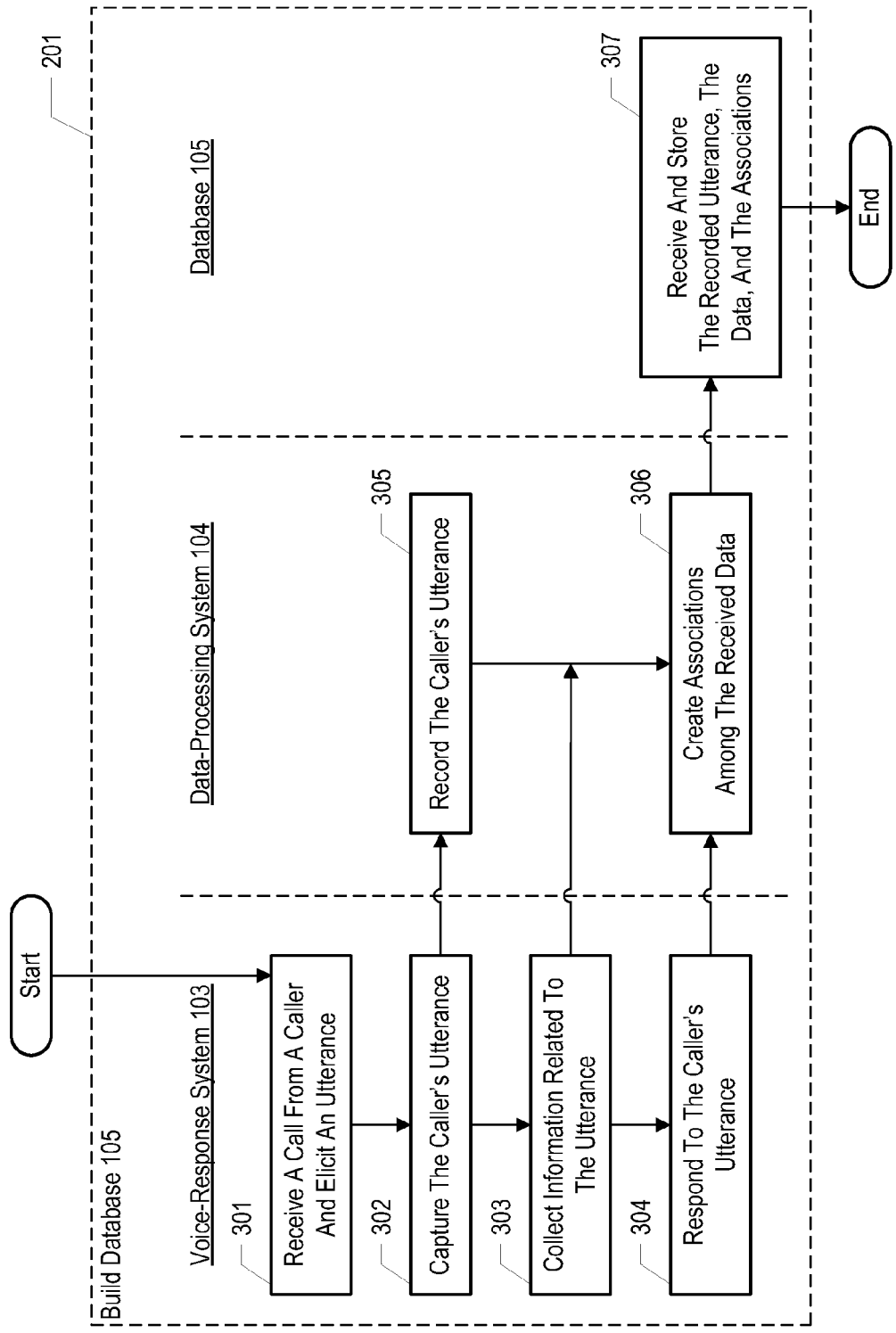
FIG. 3 depicts a flowchart of the salient tasks associated with the performance of task 201.

FIG. 3 depicts a flowchart of the salient tasks associated with the performance of task 201.

At task 301, voice-response system 103 receives a call from a caller and elicits an utterance from the caller in a manner well-known in the art. In the illustrative embodiment, voice-response system 103 provides the following prompt to every caller: "Welcome. Say Agent Assistance or Self Service." It will be clear to those having ordinary skill in the art that to elicit an utterance from a caller, voice-response system 103 must take some action, for example by issuing an announcement, a prompt, or a command to the caller.

As noted, an action that precedes or follows the caller's utterance is an event in voice-response system 103. It will be clear to those having ordinary skill in the art, after reading the present disclosure, how to make and use alternative embodiments of the present invention, in which an event preceding an utterance takes the form of audio, video, text, or any other form of communication between voice-response system 103 and the caller. An event that follows a caller utterance can take other forms too, as described below in regards to task 304.

At task 302, voice-response system 103 captures the caller's utterance and transmits it to data-processing system 104. In the illustrative embodiment, the caller's utterance is captured in a digital audio file, but it will be clear to those having ordinary skill in the art, after reading the present disclosure, how to make and use alternative embodiments of the present invention, in which the utterance is captured in other formats, such as a compressed digital audio file, as described further at task 305. It will be clear to those having ordinary skill in the art, after reading the present disclosure, how to enable task 302.

At task 303, voice-response system 103 collects relevant information related to the utterance. In the illustrative embodiment, the relevant information comprises: the event in voice-response system 103 that preceded the caller's utterance, i.e., that led the caller to make an utterance; and the telephone number of the caller. It will be clear to those having ordinary skill in the art that, when the telephone number of the caller is blocked, it is not available for the purposes of task 303 and the related associations and other operations described herein.

It will be clear to those having ordinary skill in the art, after reading the present disclosure, how to make and use alternative embodiments of the present invention in which the relevant information that is collected in regards to an utterance comprises: the time of the caller's utterance; the time of the caller's call; the caller ID of the caller; the automated number identification of the caller; the account number of the caller or any other information pertaining to the caller; the purpose of the call; the outcome of the call, i.e., successful processing, hung-up or abandoned, partial processing, routed to agent, etc.; the time spent at an event in the call flow; the duration of the call; any other information pertaining to the event or events before and after the caller's utterance; any other information that identifies the call itself, e.g., a serial number of the call. It will be clear to those having ordinary skill in the art, after reading the present disclosure, how to make and use alternative embodiments of the present invention in which the relevant information that is collected comprises other data and information that the implementers deem useful. It will be clear to those having ordinary skill in the art, after reading the present disclosure, how to enable task 303.

At task 304, voice-response system 103 responds to the caller's utterance in a manner well-known in the art. The response to the caller is an event that follows the caller's utterance. In the illustrative embodiment, this event is another prompt that tells the caller: "I do not understand. Please repeat." It will be clear to those having ordinary skill in the art, after reading the present disclosure, how to make and use alternative embodiments of the present invention in which the event that follows the utterance is another prompt, responsive information such as an account balance, a queuing action such as queuing the caller to speak with an agent, a disconnect action by the caller, a disconnect action by voice-response system 103, or any other event associated with voice-response system 103 that follows the caller's utterance.

At task 305, data-processing system 104 receives the captured utterance and makes a record of it. In the illustrative embodiment, the record is a digital audio file. It will be clear to those having ordinary skill in the art, after reading the present disclosure, how to make and use alternative embodiments of the present invention in which recording the caller's utterance takes any form or format, including, but not limited to, analog audio, digital audio, compressed digital audio, digital video, etc., so long as the recording of the caller's utterance can be stored, retrieved, and output as described in more detail below. It will be clear to those having ordinary skill in the art, after reading the present disclosure, how to enable task 305.

At task 306, data-processing system 104 receives data from voice-response system 103 (tasks 303 and 304) and from task 305 and creates associations among the received data. Task 306 is described in more detail below and in the accompanying figures.

At task 307, database 105 receives from data-processing system 104 the recoded utterance and the other data in task 306, the associations created in task 306, and stores the received information. Task 307 is described in more detail below and in the accompanying figures.

It will be clear to those having ordinary skill in the art, after reading the present disclosure, how to make and use task 201 in alternative embodiments of the present invention such that the tasks depicted in FIG. 3, are executed in a different sequence, comprise any number of constituent tasks and subtasks, or are differently grouped.

Figure 4:
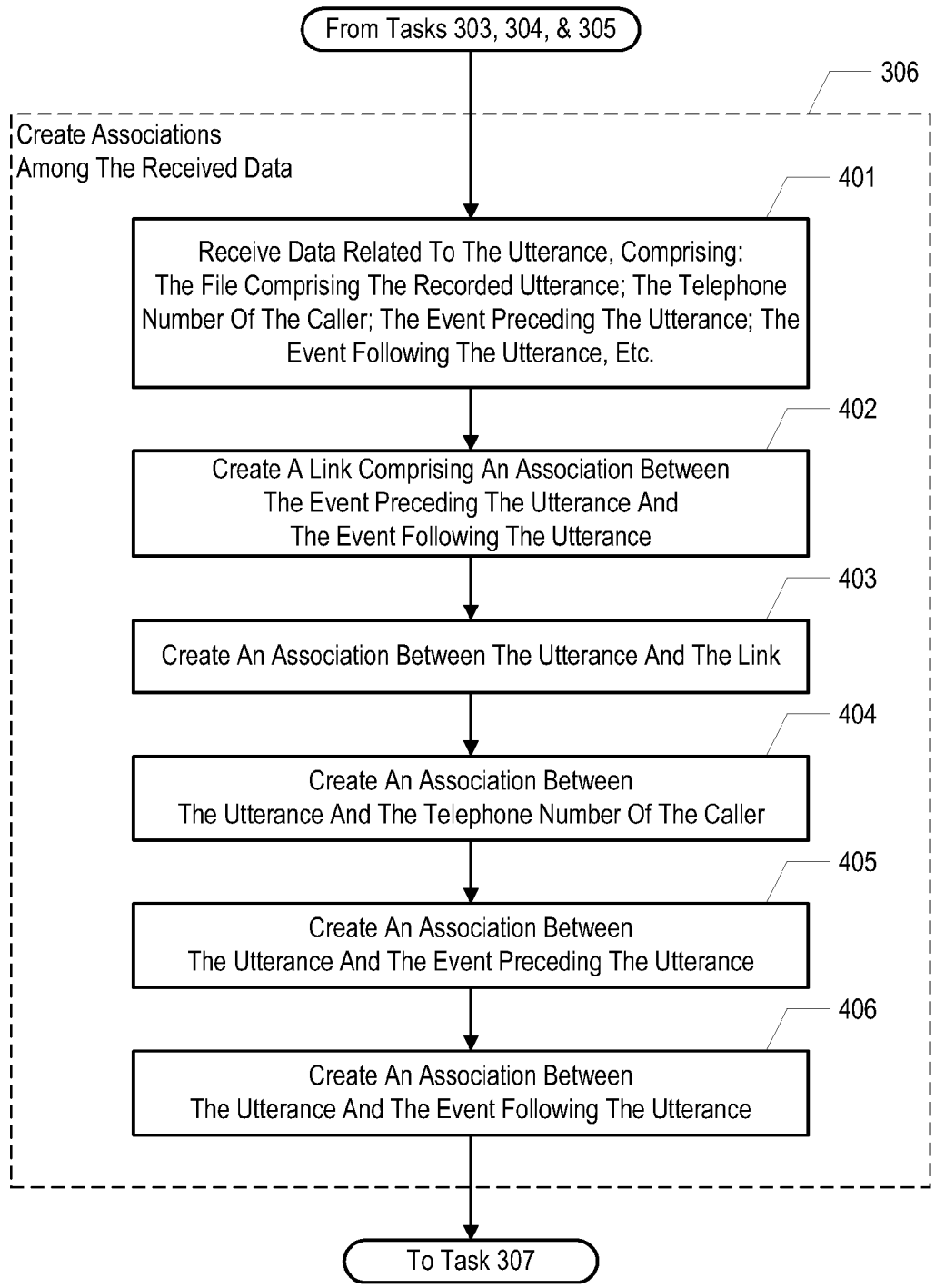
FIG. 4 depicts a flowchart of the salient tasks associated with the performance of task 306.

FIG. 4 depicts a flowchart of the salient tasks associated with the performance of task 306.

At task 401, data-processing system 104 receives data that is related to the utterance, comprising: the file that comprises the recorded utterance; the telephone number of the caller; the identifier of the event that preceded (i.e., elicited) the utterance; the identifier of the event that follows the utterance. It will be clear to those having ordinary skill in the art, after reading the present disclosure, how to enable task 401.

At task 402, data-processing system 104 creates a link. As noted, a link is a data structure that comprises an association between the event that precedes the utterance and the event that follows the utterance in voice-response system 103. Links are typically depicted in a flowgraphs as a line connecting two adjacent events. It will be clear to those having ordinary skill in the art, after reading the present disclosure, how to enable task 402.

At task 403, data-processing system 104 creates an association between the utterance and the link that it created in task 402. It will be clear to those having ordinary skill in the art, after reading the present disclosure, how to enable task 403.

At task 404, data-processing system 104 creates an association between the utterance and the telephone number of the caller. It will be clear to those having ordinary skill in the art, after reading the present disclosure, how to enable task 404.

At task 405, data-processing system 104 creates an association between the utterance and the event in voice-response 103 that preceded the utterance. It will be clear to those having ordinary skill in the art, after reading the present disclosure, how to enable task 406.

At task 406, data-processing system 104 creates an association between the utterance and the event in voice-response 103 that followed the utterance. It will be clear to those having ordinary skill in the art, after reading the present disclosure, how to enable task 405.

It will be clear to those having ordinary skill in the art, after reading the present disclosure, how to make and use task 306 in alternative embodiments of the present invention such that the tasks depicted in FIG. 4, are executed in a different sequence, comprise any number of constituent tasks and subtasks, or are differently grouped. It will be further clear to those having ordinary skill in the art, after reading the present disclosure, how to make and use alternative embodiments of the present invention in which other associations are created between an utterance and the relevant information that was collected in regards to the utterance, for example, but not limited to: the time of the caller's utterance; the time of the caller's call; the caller ID of the caller; the automated number identification of the caller; the account number of the caller or any other information pertaining to the caller; the purpose of the call; the outcome of the call, i.e., successful processing, hung-up or abandoned, partial processing, routed to agent, etc.; the time spent at an event in the call flow; the duration of the call; any other information pertaining to the event or events before and after the caller's utterance; any other information that identifies the call itself, e.g., a serial number of the call. It will be clear to those having ordinary skill in the art, after reading the present disclosure, how to make and use alternative embodiments of the present invention in which the information that is collected in regards to an utterance comprises other data and information that the implementers deem useful, which data or information can be associated with the utterance.

Figure 5:
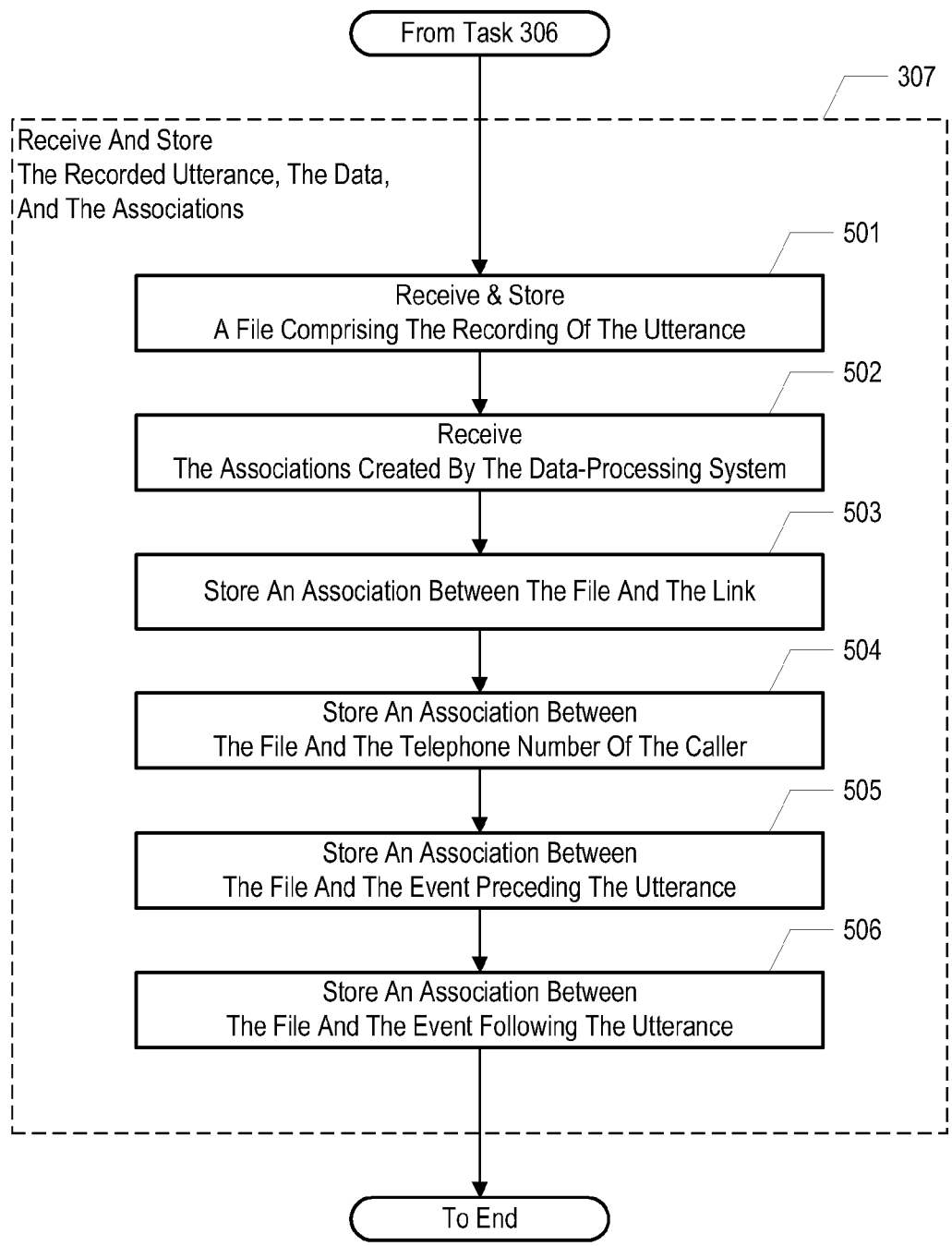
FIG. 5 depicts a flowchart of the salient tasks associated with the performance of task 307.

FIG. 5 depicts a flowchart of the salient tasks associated with the performance of task 307.

At task 501, database 105 receives and stores a file that comprises the recording of the utterance in a manner well-known in the art.

At task 502, database 105 receives the data and the associations from task 306 in a manner well-known in the art.

At task 503, database 105 stores an association between the file that comprises the recorded utterance and the link that comprises the association between the event that precedes and the event that follows the utterance. In this manner, database 105 now comprises one of the principal advantages of the present invention—namely an association between an utterance and its surrounding events. In the illustrative embodiment, the utterance is associated with a prompt of "Welcome. Say Agent Assistance or Self Service." and is further associated with the following response by voice-response system 103: "I do not understand. Please repeat." It will be clear to those having ordinary skill in the art, after reading the present disclosure, how to enable task 503.

At task 504, database 105 stores an association between the file that comprises the utterance and the telephone number of the caller. In this manner, database 105 now comprises one of the advantages of the present invention—namely an association between an utterance and the caller's telephone number. It will be clear to those having ordinary skill in the art, after reading the present disclosure, how to enable task 504. It will be clear to those having ordinary skill in the art that, when the telephone number of the caller is blocked, it is not available for the purposes of task 504 and the related associations and other operations described herein.

At task 505, database 105 stores an association between the file that comprises the utterance and the event in voice-response 103 that preceded the utterance. In this manner, database 105 now comprises one of the advantages of the present invention—namely an association between an utterance and the event in voice-response system 103 that elicited the utterance. In the illustrative embodiment, the utterance is associated with a prompt of "Welcome. Say Agent Assistance or Self Service," which elicited the caller's utterance. It will be clear to those having ordinary skill in the art, after reading the present disclosure, how to enable task 505.

At task 506, database 105 stores an association between the file that comprises the utterance and the event in voice-response 103 that followed the utterance. In this manner, database 105 now comprises one of the advantages of the present invention—namely an association between an utterance and the event in voice-response system 103 that followed in response to the utterance. In the illustrative embodiment, the utterance is associated with the following response by voice-response system 103: "I do not understand. Please repeat," which followed the caller's utterance. It will be clear to those having ordinary skill in the art, after reading the present disclosure, how to enable task 505.

It will be clear to those having ordinary skill in the art, after reading the present disclosure, how to make and use task 307 in alternative embodiments of the present invention such that the tasks depicted in FIG. 5, are executed in a different sequence, comprise any number of constituent tasks and subtasks, or are differently grouped. Moreover, it will be clear to those having ordinary skill in the art, after reading the present disclosure, how to make and use alternative embodiments of the present invention in which database 105 stores other data that is associated with the utterance, such as the caller's account number, as described in more detail in regards to task 303 and FIG. 4.

Figure 6:
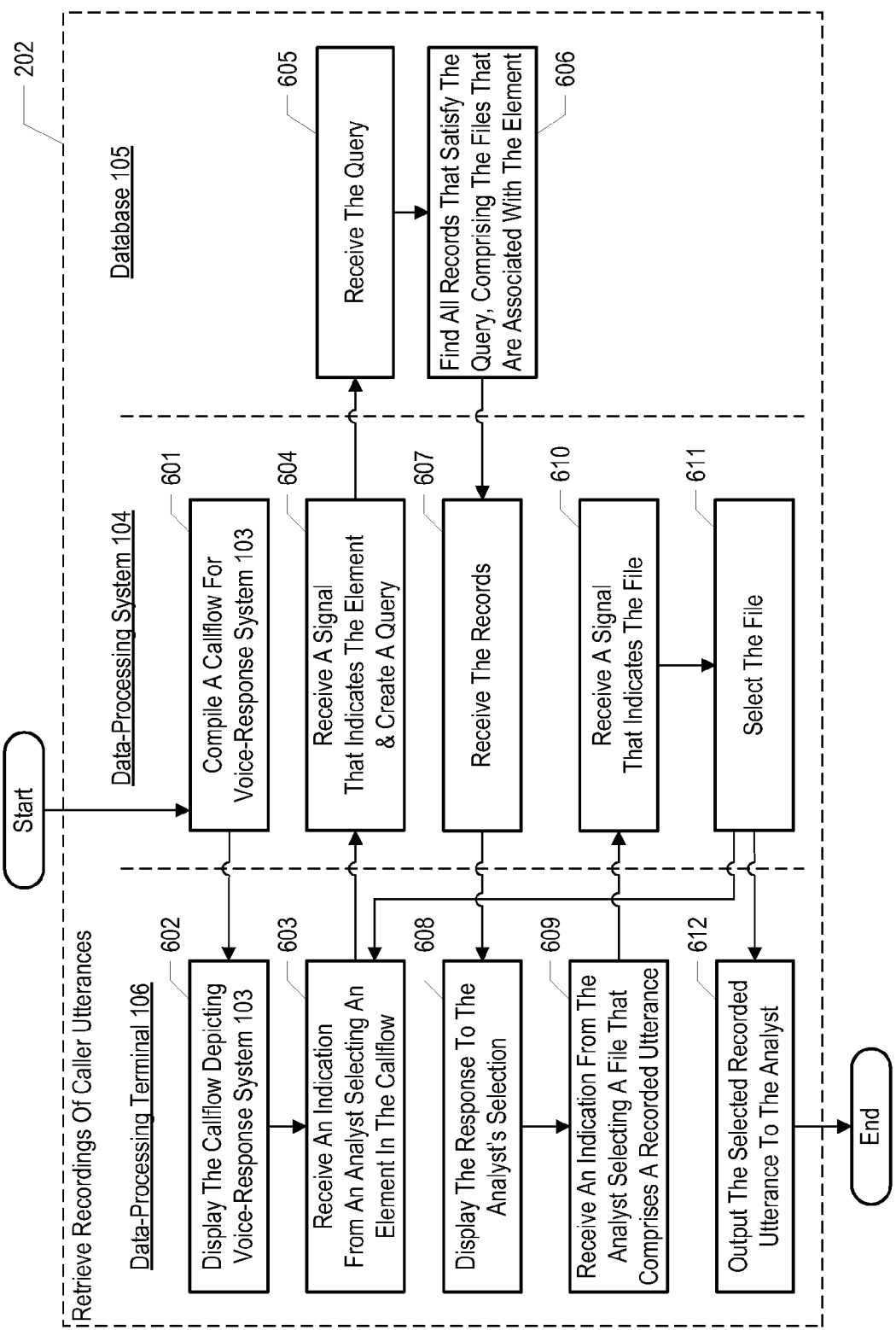
FIG. 6 depicts a flowchart of the salient tasks associated with the performance of task 202.

FIG. 6 depicts a flowchart of the salient tasks associated with the performance of task 202.

At task 601, data-processing system 104 compiles information about voice-response system 103 into a flowgraph. A flowgraph presents to an analyst a visual representation of (and statistics pertaining to) the paths taken by the calls that were processed by voice-response system 103, to enable the analyst to identify and correct sub-optimal performance in the system. For example, flowgraphs are described in more detail in U.S. Patent Application Publication No. 20090245493 A1.

It will be clear to those having ordinary skill in the art, after reading the present disclosure, how to make and use alternative embodiments of the present invention in which a flowgraph comprises other information than what is listed above. It will be clear to those having ordinary skill in the art, after reading the present disclosure, how to enable task 601.

At task 602, data-processing terminal 106 receives the flowgraph information from data-processing system 104, and displays it in a manner well-known in the art. An exemplary portion of a flowgraph of voice-response system 103 is described in more detail below and in FIG. 7. Some examples for the tasks in FIG. 6 will be illustrated with reference to the flowgraph example in FIG. 7.

At task 603, data-processing terminal 106 receives an indication from an analyst that indicates an element in the flowgraph. In the illustrative embodiment, the element in the exemplary flowgraph is a link. It will be clear to those having ordinary skill in the art, after reading the present disclosure, how to make and use alternative embodiments of the present invention in which an element in a flowgraph can be other information that is associated with a caller utterance, such as call duration, date, caller account information, call outcome, etc.

In the illustrative embodiment, the link of interest to the analyst is a "no-match" link—so called because voice-response system 103 cannot match the caller's utterance to an existing service option, i.e., it cannot match the utterance to one of the pre-defined choices that are available to the caller. In other words, voice-response system 103 does not "understand" the caller's utterance. Link 702-707 in FIG. 7 exemplifies a no-match link. It will be clear to those having ordinary skill in the art, after reading the present disclosure, how to make and use alternative embodiments of the present invention in which the element of interest is another kind of link, another flowgraph element such as an event, or a caller telephone number.

At task 604, data-processing system 104 receives a signal from data-processing terminal 106 that indicates the element selected by the analyst—in a manner well-known in the art. Upon receiving the indication, data-processing system 104 creates a query for database 105 to find all data pertaining to the selected element. It will be clear to those having ordinary skill in the art, after reading the present disclosure, how to enable task 604.

At task 605, database 105 receives the query from task 604 in a manner well-known in the art.

At task 606, database 105 processes the received query to find all the records that satisfy the query, i.e., only those records that are associated with the selected element indicated by the analyst. The records are sent to data-processing system 104 in a manner well-known in the art. It will be clear to those having ordinary skill in the art, after reading the present disclosure, how to enable task 606.

At task 607, data-processing system 104 receives the records retrieved from database 105 in a manner well-known in the art. Data-processing system 104 further processes and organizes the information for delivery to data-processing terminal 106. It will be clear to those having ordinary skill in the art, after reading the present disclosure, how to enable task 607.

At task 608, data-processing terminal 106 displays a response based on the information retrieved from database 105. In the illustrative embodiment, the analyst selects a no-match link as the element of interest in the flowgraph, which is exemplified by link 702-707 in FIG. 7. Table 1 presents an illustration of an exemplary response displayed at task 608.

TABLE 1

Example of a link display providing access to associated utterances.
Link Summary Report For Link =
Welcome:I_Do_Not_Understand

| Caller Telephone Number | Call Outcome | Call Duration | No. Of Utterances |
|---|---|---|---|
| (111) 999-8576 | routed | 10:33.50 | 6 (show) |
| (222) 888-7654 | routed | 37:02.90 | 8 (show) |
| (333) 777-6543 | hang up | 00:25.25 | 1 (show) |

In Table 1, the displayed information comprises: the caller's telephone number; the final outcome of the call; the call duration; and the number of caller utterances that are associated with the selected no-match link for each caller telephone number. For the first telephone number, there are six utterances associated with this link and a "(show)" hyperlink to the files comprising each recorded utterance. For the second telephone number, there are eight utterances associated with this link and the corresponding hyperlink. For the third telephone number, there is only one utterance associated with this link and the corresponding hyperlink to its recording.

Although the information in Table 1 is displayed in tabular form, it will be clear to those having ordinary skill in the art, after reading the present disclosure, how to make and use alternative embodiments of the present invention in which the presentation of the information takes any form and comprises any content that the implementers deem suitable. It will be clear to those having ordinary skill in the art, after reading the present disclosure, how to enable task 608.

At task 609, data-processing terminal 106 receives a further selection from the analyst, i.e., an indication of a file that comprises a recorded utterance of interest. In the example of Table 1, the analyst indicates the entry in the lower right corner, i.e., the entry that shows one utterance associated with telephone number (333) 777-6543. It will be clear to those having ordinary skill in the art, after reading the present disclosure, how to enable task 609.

At task 610, data-processing system 104 receives the corresponding signal from data-processing terminal 106 that indicates the file of interest to the analyst. It will be clear to those having ordinary skill in the art, after reading the present disclosure, how to enable task 610.

At task 611, data-processing system 104 selects the indicated file from among the previously retrieved information and transmits the file to data-processing terminal 106. In the example of Table 1, the selected file comprises the single utterance selected by the analyst in task 609, i.e., the entry associated with telephone number (333) 777-6543.

It will be clear to those having ordinary skill in the art, after reading the present disclosure, how to make and use alternative embodiments of the present invention that comprise additional iterations of tasks 603 through 611 in which the analyst is presented with and selects progressively more granular data. The iterations eventually lead the analyst to select a file that comprises an individual recorded utterance of interest in accordance with task 609. For example, if the analyst selected the top right entry in Table 1, six files of utterances would be presented at task 608. At task 609, the analyst would select one of the six files. At task 610, data-processing system 104 would receive the analyst's indication and at task 611 it would select the file that comprises the utterance of interest.

It will be clear to those having ordinary skill in the art, after reading the present disclosure, how to enable task 611.

At task 612, data-processing terminal 106 outputs the file that comprises the recorded utterance, i.e., there is audio output of the recorded utterance in a manner well-known in the art. It will be clear to those having ordinary skill in the art, after reading the present disclosure, how to make and user alternative embodiments of the present invention in which the output takes other forms, such as playing a video.

The execution of task 612 provides one of the principal advantages of the present invention—namely that an analyst presented with a complex flowgraph that represents a complex system can choose a link of interest and in a few short steps listen to the utterances associated with that link. The prior art does not associate individual utterances with a particular link in a flowgraph. By contrast, the illustrative embodiment in accordance with the present invention associates a caller utterance with any or all of several elements in a flowgraph. Therefore, it provides a huge time advantage by enabling pinpoint access to utterances.

Thus, in an illustrative embodiment, an analyst who wishes to determine why many incoming calls flow directly from the "Welcome" prompt to the "I Do Not Understand—Please Repeat" event can speedily gain access to the utterances associated with that link and listen to each one. In doing so, the analyst may discover a pattern that helps improve the voice-response system. For example, callers might be uttering a request that is not currently available but which could be added to the voice-response system. Perhaps callers are speaking with an accent that can be trained into the voice recognition sub-system. Perhaps callers with a hard-to-understand accent are calling from a certain area code, which could be given alternative treatment within the voice-response system to prevent cycling callers through the repetition loop.

Thus, one of the notable advantages of the present invention is streamlined access to caller utterances through innovative associations with key elements of a flowgraph, such as a link in the flowgraph, a caller's telephone number, an event that precedes the utterance, or an event that follows the utterance. One of the further advantages of the present invention is streamlined access to caller utterances through innovative associations with key aspects of a call flow. It will be clear to those having ordinary skill in the art, after reading the present disclosure, how to make and use alternative embodiments of the present invention, in which streamlined access to utterances is based on other criteria or associations, for example, but not limited to: the caller ID of the caller; time of day; date; call duration; time in queue; the time of the caller's utterance; the time of the caller's call; the automated number identification of the caller; the account number of the caller or any other information pertaining to the caller; the purpose of the call; the outcome of the call, i.e., successful processing, hung-up or abandoned, partial processing, routed to agent, etc.; the time spent at an event in the call flow; the duration of the call; any other information pertaining to the event or events before and after the caller's utterance; any other information that identifies the call itself, e.g., a serial number of the call.

In some illustrative embodiments, an analyst can play back an entire call made by a caller, because the present invention enables the retrieval of utterances and events that are associated with a serial number of a call such that the call is reconstructed from end to end. In contrast to the prior art where the end-to-end recording of a call is undifferentiated, the present invention enables the analyst to select elements of the call that are of interest and to listen to the utterance or utterances that are associated with the selected elements of interest. An association between an utterance and a call serial number enables an analyst to access an entire call from an utterance file, and vice-versa, to access the constituent utterances from a call serial number or other call identifier. Table 2 presents an illustration of an exemplary response displayed at task 608 in regards to end-to-end call playback based on call serial numbers from a certain date.

TABLE 2

Example of a call playback display providing access to associated
utterances and events and end-to-end call playback.
Summary Report For Playback of Calls of 2010:March:17

| Call Serial No. | Call Outcome | Call Duration | No. Of Utterances | No. Of Events | Playback Call |
|---|---|---|---|---|---|
| 001-2010-03-17 | routed | 10:33.50 | 6 (show) | 4 (show) | (play) |
| 002-2010-03-17 | routed | 37:02.90 | 8 (show) | 4 (show) | (play) |
| 003-2010-03-17 | hang up | 00:25.25 | 1 (show) | 2 (show) | (play) |

In the example of Table 2, for each call that occurred on Mar. 17, 2010, the analyst can (i) hyperlink to the utterances of each call; (ii) hyperlink to the events of each call; or (iii) playback the entire reconstructed call. It will be clear to those having ordinary skill in the art, after reading the present disclosure, how to make and use alternative embodiments of the present invention in which the presentation of the information takes any form and comprises any content that the implementers deem suitable.

It will be clear to those having ordinary skill in the art, after reading the present disclosure, how to make and use alternative embodiments of the present invention in which other associations among the information that is collected and stored can be presented and exploited for streamlined access to the information of interest to an analyst. For example, an analyst who has retrieved a file comprising a recorded utterance can view the telephone number of the caller, can retrieve the reconstructed call, can retrieve all files associated with a customer identifier, can retrieve all recorded utterances associated with a call outcome, can retrieve all recorded utterances associated with a call topic, etc.

It will be clear to those having ordinary skill in the art, after reading the present disclosure, how to enable task 612. It will be clear to those having ordinary skill in the art, after reading the present disclosure, how to make and use task 202 in alternative embodiments of the present invention such that the tasks depicted in FIG. 6 are executed in a different sequence, comprise any number of constituent tasks and sub-tasks, or are differently grouped.

Figure 7:
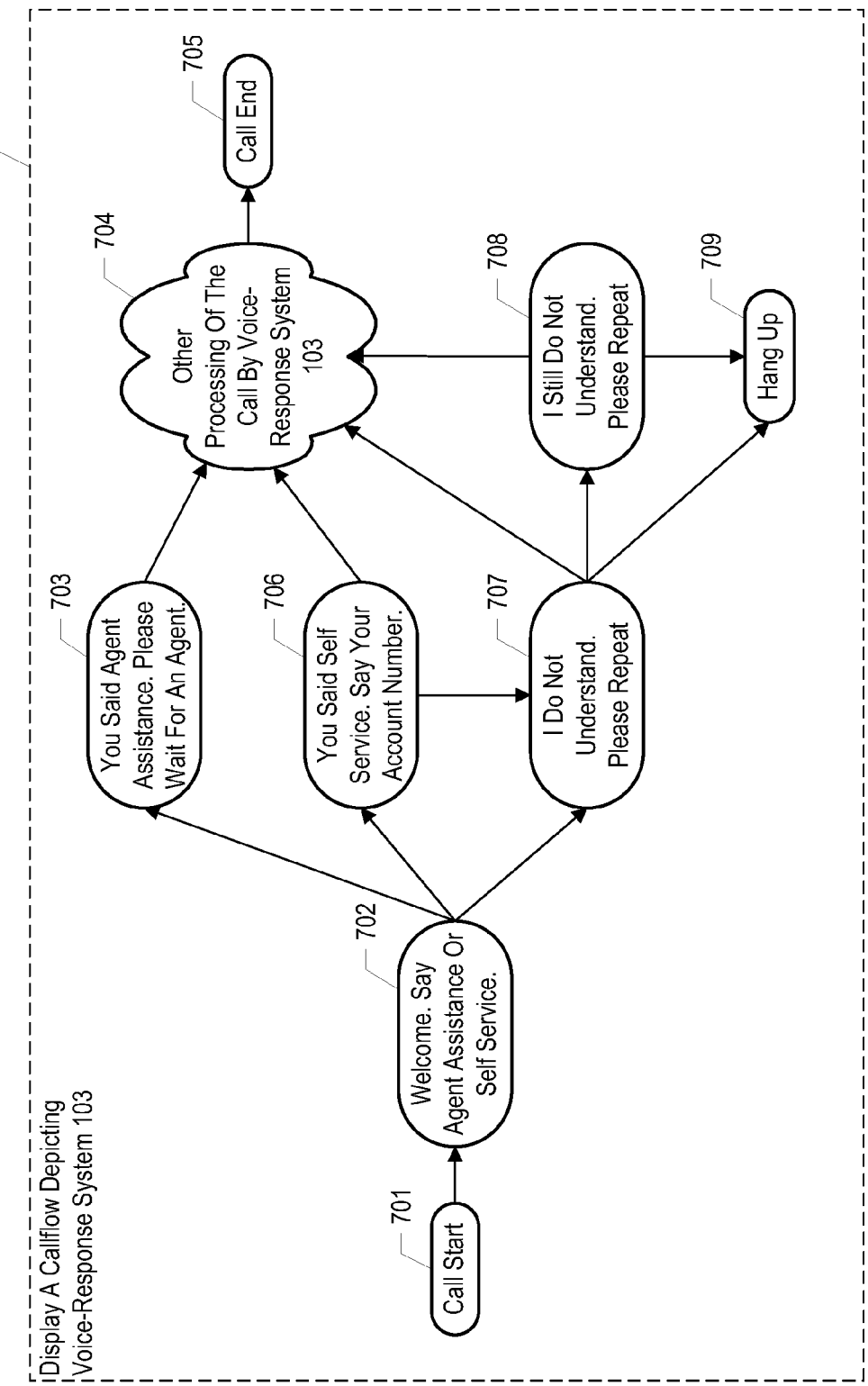
FIG. 7 depicts an illustrative embodiment of the salient portions of a flowgraph associated with the performance of task 602.

FIG. 7 depicts an illustrative embodiment of the salient portions of a flowgraph associated with the performance of task 602.

Element 701 is an event that is the starting point of every call to voice-response system 103.

Element 702 is an event that occurs in the form of a prompt to callers that states: "Welcome. Say Agent Assistance or Self Service."

Element 703 is an event that occurs in the form of a command to those callers who said "Agent Assistance" asking them to wait for an agent.

Element 704 represents an agglomeration of elements in the flowgraph that collectively process calls flowing from elements 703, 706, 707, and 708. In general, callers whose utterance is understood are routed to element 704.

Element 705 is an event that is an end to a call that was processed in element 704.

Element 706 is an event that occurs in the form of a prompt to callers who said "Self Service" further prompting them to say their account number. Those whose utterance is properly understood flow via link 706-704 to element 704 for further processing. Those whose utterance is not understood flow to element 707 via link 706-707.

Element 707 is an event that occurs in the form of a prompt to callers whose utterance was not understood after event 702 or after event 706. The prompt at element 707 tells callers that voice-response system 103 did not understand them and asks them to repeat. Thus, link 702-707 and link 706-707 represent "no-match" links where the system could not match a caller's utterance to the available service options. Callers who next utterance is understood flow to element 704. Callers whose next utterance is not understood flow to element 708.

Element 708 is an event that occurs in the form of a prompt telling callers that voice-response system 103 did not understand their utterance and asking them again to repeat. Thus, link 707-708 is another example of a no-match link in the flowgraph. Callers whose utterance is understood flow to element 704.

At element 709, the flowgraph depicts a call abandoned by the caller, i.e., the caller hangs up or disconnects. A caller who heard the prompt at element 707 might simply hang up. Likewise, a caller who was asked yet again to repeat at element 708 might also disconnect, perhaps out of frustration. Thus, link 707-709 and link 708-709 represent abandoned calls that might be of particular interest to an analyst, because the respective calls never reached the processing stage within voice-response system 103. If there are utterances associated with these links, an analyst might glean useful information from them.

As noted, FIG. 7 represents only a portion of a flowgraph in the illustrative embodiment. It will be clear to those having ordinary skill in the art, after reading the present disclosure, how to make and use task 602 in alternative embodiments of the present invention such that the elements depicted in FIG. 7 use different language, represent different events, are executed in a different sequence, comprise any number of constituent elements, or are differently grouped.

It will be clear to those having ordinary skill in the art, after reading the present disclosure, how to make and use alternative embodiments of the present invention that comprise a subset of the elements and tasks depicted in the present disclosure. It is to be understood that the disclosure teaches just one example of the illustrative embodiment and that many variations of the invention can easily be devised by those having ordinary skill in the art after reading this disclosure and that the scope of the present invention is to be determined by the following claims.

What is claimed is:

1. A method comprising:
   receiving at a data-processing system a first signal that indicates selection of a link in a flowgraph, wherein the link comprises an association between a first event and a second event in a voice-response system;
   retrieving by the data-processing system a file that is associated with the link, wherein the file comprises a recording of an utterance that was made by a caller in response to the first event in the voice-response system, wherein the utterance is associated with selected elements of a call that are of interest; and
   playing the utterance to a user.

2. The method of claim 1 further comprising:
   receiving at the data-processing system a second signal that is associated with the file; and
   in response to the receipt of the second signal, transmitting from the file the recording of the utterance.

3. The method of claim 1 further comprising:
   receiving at the data-processing system a second signal that is associated with the file; and
   in response to the receipt of the second signal, transmitting a telephone number that is associated with the utterance.

4. The method of claim 1 further comprising:
receiving at the data-processing system a second signal that is associated with the file; and
in response to the receipt of the second signal, transmitting at least one datum that is associated with a call that comprises the utterance.

5. The method of claim 4 wherein the at least one datum comprises a reconstruction of the call.

6. A method comprising:
receiving, at a data-processing system, a first signal that indicates an event in a voice-response system, wherein the event is associated with a selected link in a flowgraph;
retrieving, by the data-processing system, a file that is associated with the event, wherein the file comprises a recording of an utterance that was made by a caller in response to the event, wherein the utterance is associated with selected elements of a call that are of interest; and
playing the utterance to a user.

7. The method of claim 6 further comprising:
receiving, at the data-processing system, a second signal that is associated with the file; and
in response to the receipt of the second signal, transmitting from the file the recording of the utterance.

8. The method of claim 6 further comprising:
receiving, at the data-processing system, a second signal that is associated with the file; and
in response to the receipt of the second signal, transmitting a telephone number that is associated with the utterance.

9. A method comprising:
receiving, at a data-processing system, a first signal that indicates an event in a voice-response system, wherein the event is associated with a selected link in a flowgraph;
retrieving, by the data-processing system, a file that is associated with the event, wherein the file comprises a recording of an utterance, and wherein the event occurred in response to the utterance, wherein the utterance is associated with selected elements of a call that are of interest; and
playing the utterance to a user.

10. The method of claim 9 further comprising:
receiving, at the data-processing system, a second signal that is associated with the file; and
in response to the receipt of the second signal, transmitting from the file the recording of the utterance.

11. The method of claim 9 further comprising:
receiving, at the data-processing system, a second signal that is associated with the file; and
in response to the receipt of the second signal, transmitting a telephone number that is associated with the utterance.

12. A method comprising:
recording to a file, by a data-processing system, an utterance made by a caller in response to a first event in a voice-response system;
storing the file in a database, wherein the file is associated with a link that comprises an association between the first event and a second event in the voice-response system, and wherein the second event occurred in response to the utterance;
receiving at the database a first signal that indicates the link and a telephone number of the caller;
in response to the receipt of the first signal, retrieving from the database those files that are associated with the link and with the telephone number, wherein the utterance is associated with selected elements of a call that are of interest; and
playing the utterance to a user.

13. The method of claim 12 further comprising:
receiving at the database a first signal that indicates the link; and
in response to the receipt of the first signal, retrieving from the database those files that are associated with the link.

14. The method of claim 12 further comprising:
storing in the database an association between the file and the telephone number of the caller.

15. The method of claim 12 further comprising:
receiving at the database a first signal that indicates the first event; and
in response to the receipt of the first signal, retrieving from the database those files that are associated with the first event.

16. The method of claim 12 further comprising:
receiving at the database a first signal that indicates the second event; and
in response to the receipt of the first signal, retrieving from the database the files that are associated with the second event.

17. The method of claim 12 further comprising:
storing in the database an association between the file and a datum;
receiving at the database a first signal that indicates the datum; and
in response to the receipt of the first signal, retrieving from the database the files that are associated with the datum.

18. The method of claim 17 wherein the datum is the telephone number.

19. The method of claim 17 wherein the datum is an identifier of a customer.

20. The method of claim 17 wherein the datum is an identifier of a call that comprises the utterance.

21. The method of claim 17 wherein the datum is an outcome of a call.

22. The method of claim 17 wherein the datum is a topic of a call.

23. A method comprising:
recording to a first file, by a data-processing system, a first utterance in response to a first event in a voice-response system;
recording to a second file, by the data-processing system, a second utterance in response to a second event in a voice-response system;
storing in a database:
(i) the first file,
(ii) an association between the first file and the first event,
(iii) the second file, and
(iv) an association between the second file and the second event;
receiving at the database a first signal that indicates selection of a link and a telephone number of the caller;
in response to the receipt of the first signal, retrieving from the database those files that are associated with the link and with the telephone number, wherein the first utterance is associated with selected elements of a call that are of interest; and
playing the first utterance to a user.

24. The method of claim 23 further comprising:
in response to a signal that indicates the first event, retrieving from the database those files associated with the first event without retrieving a file that comprises an utterance and that is not associated with the first event.

25. The method of claim 23 wherein the first file is further associated with a link that comprises an association between the first event and a third event in the voice-response system; and further comprising:

in response to a signal that indicates the link, retrieving from the database those files associated with the link without retrieving a file that comprises an utterance and that is not associated with the link.

\* \* \* \* \*